US011140109B2

(12) United States Patent
Cooper et al.

(10) Patent No.: US 11,140,109 B2
(45) Date of Patent: Oct. 5, 2021

(54) SYSTEM AND METHOD FOR TRANSPARENT COMMUNICATIONS

(71) Applicant: Safe Communications Consultants, Aurora, IL (US)

(72) Inventors: Jeffery Cooper, Ortonville, MI (US); William Schalz, Aurora, IL (US); Kevin Milak, Elkhart, IN (US); Andrew Cebull, South Lyon, MI (US)

(73) Assignee: SAFE COMMUNICATIONS CONSULTANTS, LLC, Bartlett, IL (US)

( * ) Notice: Subject to any disclaimer, the term of this patent is extended or adjusted under 35 U.S.C. 154(b) by 0 days.

(21) Appl. No.: 16/910,221

(22) Filed: Jun. 24, 2020

(65) Prior Publication Data

US 2020/0403950 A1 Dec. 24, 2020

Related U.S. Application Data

(60) Provisional application No. 62/865,584, filed on Jun. 24, 2019.

(51) Int. Cl.
*H04L 12/58* (2006.01)
*H04L 12/18* (2006.01)
*G06Q 50/22* (2018.01)

(52) U.S. Cl.
CPC ............ *H04L 51/14* (2013.01); *G06Q 50/22* (2013.01); *H04L 12/1813* (2013.01); *H04L 51/04* (2013.01)

(58) Field of Classification Search
CPC ....... H04L 51/14; H04L 51/04; H04L 51/046; H04L 12/1813; H04L 12/1822; G06Q 50/22
See application file for complete search history.

(56) References Cited

U.S. PATENT DOCUMENTS

| 7,174,453 | B2* | 2/2007 | Lu ........................ G06Q 10/107 707/999.01 |
| 7,451,184 | B2* | 11/2008 | Malik ..................... H04L 51/12 709/206 |

(Continued)

OTHER PUBLICATIONS

Spytech Software and Design. Spytech Online; Security, Monitoring, and Privacy Solutions. Taken from post Jan. 6, 2005. Retrieved from: https://web.archive.org/web/20050106094152/https://www.spytech-web.com/employee-monitoring.shtml on Jun. 7, 2019.

(Continued)

*Primary Examiner* — Alina A Boutah
(74) *Attorney, Agent, or Firm* — Carlson, Gaskey & Olds, P.C.

(57) ABSTRACT

An example method of facilitating communication between a group leader and minor through a messaging platform includes linking a minor account of the minor to a guardian account of the minor's legal guardian. A group leader account is linked to both the minor and guardian accounts. A messaging interface is provided that enables the group leader and minor accounts to transmit messages to each other within the messaging platform. For each particular message transmitted between the group leader and minor accounts, a copy is delivered to the recipient and the guardian account without requiring guardian approval of the particular message.

18 Claims, 4 Drawing Sheets

(56) References Cited

U.S. PATENT DOCUMENTS

| | | | |
|---|---|---|---|
| 7,970,388 B2 | 6/2011 | Pfeffer et al. | |
| 9,083,666 B2 | 7/2015 | Lu | |
| 9,590,936 B2* | 3/2017 | Jarrett | H04L 29/06986 |
| 9,838,535 B2 | 12/2017 | Martino et al. | |
| 2002/0116641 A1* | 8/2002 | Mastrianni | H04L 51/12 |
| | | | 726/11 |
| 2009/0061907 A1* | 3/2009 | Richardson | H04M 1/66 |
| | | | 455/458 |
| 2013/0104246 A1 | 4/2013 | Bear et al. | |
| 2013/0196307 A1* | 8/2013 | Estrada | G09B 5/06 |
| | | | 434/430 |
| 2015/0341484 A1* | 11/2015 | Yablokov | G06F 21/629 |
| | | | 455/410 |
| 2016/0142997 A1* | 5/2016 | Hwang | H04W 68/005 |
| | | | 455/412.2 |
| 2016/0174024 A1* | 6/2016 | Gavin | H04W 4/44 |
| | | | 455/456.3 |
| 2016/0337371 A1* | 11/2016 | Chung Davidson | H04L 63/102 |
| 2017/0149795 A1* | 5/2017 | Day, II | H04W 12/086 |
| 2018/0069813 A1* | 3/2018 | Tevonian | H04L 67/1061 |
| 2018/0098206 A1* | 4/2018 | Nguyen | H04L 51/12 |
| 2019/0022536 A1* | 1/2019 | Hu | A63F 13/73 |
| 2019/0089669 A1* | 3/2019 | Govindarajan | G06F 21/606 |
| 2019/0104100 A1* | 4/2019 | Emerson | H04L 51/046 |
| 2020/0304474 A1* | 9/2020 | Kisko | H04L 9/3239 |

OTHER PUBLICATIONS

U.S. Center for Safesport; Minor Athlete Abuse Prevention Policies, Jan. 23, 2019.

* cited by examiner

SYSTEM AND METHOD FOR TRANSPARENT COMMUNICATIONS

CROSS-REFERENCE TO RELATED APPLICATIONS

This application claims priority to U.S. Provisional Application No. 62/865,584 which was filed on Jun. 24, 2019, and is incorporated herein by reference in its entirety.

BACKGROUND

This disclosure relates to a method and system for providing transparent communications between users through a communication platform, and more particularly to between group leader, minor users, and legal guardians of the minor users.

Coaches of a team typically share information with parents and guardians of child minors who are members of the team. Various techniques are utilized for sharing information, such as email communications and text messages.

SUMMARY

A method of facilitating communication between a group leader and a minor through a messaging platform according to an example of the present disclosure includes linking a minor account of a minor to a guardian account of a legal guardian of the minor. A group leader account of a group leader of a group to which the minor belongs outside of the messaging platform is linked to both the minor account and guardian account based on receiving approval from the guardian account. A messaging interface is provided that enables the group leader account and minor account to transmit messages to each other within the messaging platform as long as the minor account remains linked to both the guardian account and the group leader account. For each particular message transmitted by one of the group leader account and the minor account, a copy of the message is delivered to both the guardian account and to the other of the group leader account and minor account without requiring guardian approval of the particular message. The group leader account is prevented from accessing the external contact information for the minor in the messaging platform, which thereby prevents the group leader from bypassing the messaging platform to transmit messages to the minor.

In a further embodiment of any of the foregoing embodiments, linking the group leader account to the minor account can only be performed while the minor account is linked to the guardian account.

In a further embodiment of any of the foregoing embodiments, delivering a copy of the message includes delivering the message into a chat that includes the minor account.

In a further embodiment of any of the foregoing embodiments, the chat is a group chat that also has a plurality of additional minor accounts each linked to a respective additional guardian account.

In a further embodiment of any of the foregoing embodiments, delivering a copy of the message includes delivering the message into a non-chat inbox in the messaging platform.

In a further embodiment of any of the foregoing embodiments, the messaging platform does not store any external contact information for directly contacting the minor outside of the communication platform.

In a further embodiment of any of the foregoing embodiments, the messages are a first type of messages that can be responded to, and the messaging interface also enables the group leader account to submit a second type of message, which is a broadcast message that cannot be responded to, to the minor account and the guardian account. The minor account and guardian account cannot send the second type of message in the messaging platform.

In a further embodiment of any of the foregoing embodiments, based on receiving a request from the group leader to unlink the group leader account from the guardian account, the group leader account is automatically unlinked from both the guardian account and minor account, and the group leader's access to the messaging interface is disabled, thereby precluding the group leader account and minor account from transmitting additional messages to each other through the messaging interface.

In a further embodiment of any of the foregoing embodiments, the method includes preventing the group leader account from linking to a particular minor account based on the particular minor account not being linked to a guardian account.

A communication system that facilitates communication between a group leader and a minor in a messaging platform according to an example of the present disclosure includes a server and a plurality of client devices, each having a respective processor operatively connected to respective memory. The server is operable to cooperate with the plurality of client devices to link a minor account of a minor to a guardian account of a legal guardian of the minor. A group leader account of a group leader of a group to which the minor belongs outside of the messaging platform is linked to both the minor account and guardian account based on receiving approval from the guardian account. A messaging interface is provided that enables the group leader account and minor account to transmit messages to each other within the messaging platform as long as the minor account remains linked to both the guardian account and the group leader account. For each particular message transmitted by one of the group leader account and the minor account, a copy of the message is delivered to the guardian account and to the other of the group leader account and minor account without requiring guardian approval of the particular message.

In a further embodiment of any of the foregoing embodiments, the communication system only permits linking the group leader account to the minor account while the minor account remains linked to the guardian account.

In a further embodiment of any of the foregoing embodiments, the server is configured to deliver a copy of the message to a chat interface of a software client on one of the client devices.

In a further embodiment of any of the foregoing embodiments, the chat is a group chat that also includes a plurality of additional minor accounts each linked to a respective additional guardian account.

In a further embodiment of any of the foregoing embodiments, the server is configured to deliver a copy of the message into a non-chat inbox of a software client on one of the client devices.

In a further embodiment of any of the foregoing embodiments, the messaging platform does not store any external contact information for directly contacting the minor outside of the communication platform.

In a further embodiment of any of the foregoing embodiments, the messages are a first type of messages that can be responded to, and the messaging interface also enables the group leader account to submit a second type of message, which is a broadcast message that cannot be responded to, to the minor account and the guardian account. The minor account and guardian account cannot send the second type of message in the messaging platform.

In a further embodiment of any of the foregoing embodiments, the server is configured to, based on receiving a request from the group leader to unlink the group leader account from the guardian account, automatically unlink the group leader account from both the guardian account and minor account, and disable the group leader's access to the messaging interface, thereby precluding the group leader account and minor account from transmitting additional messages to each other through the messaging interface.

In a further embodiment of any of the foregoing embodiments, the server is configured to prevent the group leader account from linking to a minor account based on the minor account not being linked to a guardian account.

A method of facilitating communication between a group leader and a minor through a messaging platform according to an example of the present disclosure includes linking a minor account of a minor to a guardian account of a legal guardian of the minor. The minor account includes external contact information for contacting the minor outside of the messaging platform, including at least one of a phone number and email address for the minor. A group leader account of a group leader of a group to which the minor belongs is linked to both the minor account and guardian account. A messaging interface is provided that enables the group leader account and minor account to transmit messages to each other within the messaging platform as long as the minor account remains linked to both the guardian account and the group leader account. For each message transmitted by one of the group leader account and the minor account, a copy of the message is delivered to both the guardian account and to the other of the group leader account and minor account. The group leader account is prevented from accessing the external contact information for the minor in the messaging platform, which thereby prevents the group leader from bypassing the messaging platform to transmit messages to the minor.

In a further embodiment of any of the foregoing embodiments, the messages are a first type of messages that can be responded to, and the messaging interface also enables the group leader account to submit a second type of message, which is a broadcast message that cannot be responded to, to the minor account and the guardian account. The minor account and guardian account cannot send the second type of message in the messaging platform.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION

Many group leaders have the contact information for a child in their group, but they do not necessarily have the parent's contact information. This presents an opportunity for the sharing of inappropriate material between the group leader and minor without detection by the guardian.

Utilizing the techniques disclosed herein, a messaging platform is provided in which group leaders are required to include parents/legal guardians in all electronic communications with minors under the care of legal guardians. For the purposes of this disclosure, the term "group leader" includes anyone who serves in a supervisory/oversight role in any activities involving minors, including but not limited to teachers, coaches, scout leaders, clergy, chaperones, bosses/managers, athletic directors, and/or school or team administrators. Utilizing the techniques disclosed herein, the guardian can monitor communications by having any and all communications between group leaders and minors (e.g., children) simultaneously sent to that minor's legal guardian, as well as any other communications between any minor and other third parties utilizing the system. The system can be configured either to prohibit the storing of any direct contact information for contacting a minor outside of the messaging platform (e.g., email address, phone number), or to the extent such information is stored to conceal it from the group leader. Under either configuration, the messaging platform provides a secure and transparent way to facilitate communication between group leaders and minors while also providing for guardian monitoring of that communication, and also preventing the group leader and minor from obtaining each other's direct contact information.

The system can be configured to provide these features for email messaging, text type messaging, in-app messaging, and/or for phone calls, (e.g., between the guardian and group leader, or in a group call format between the guardian, group leader, and minor subject to the availability of the guardian). The system can be configured to preclude the third party from being able to directly contact the minor outside of the messaging platform. By preventing circumvention of the software protections, the legal guardian cannot be cut out of the communications loop to minimize or otherwise reduce the opportunity for inappropriate communication between the third party and minor.

Figure 1:
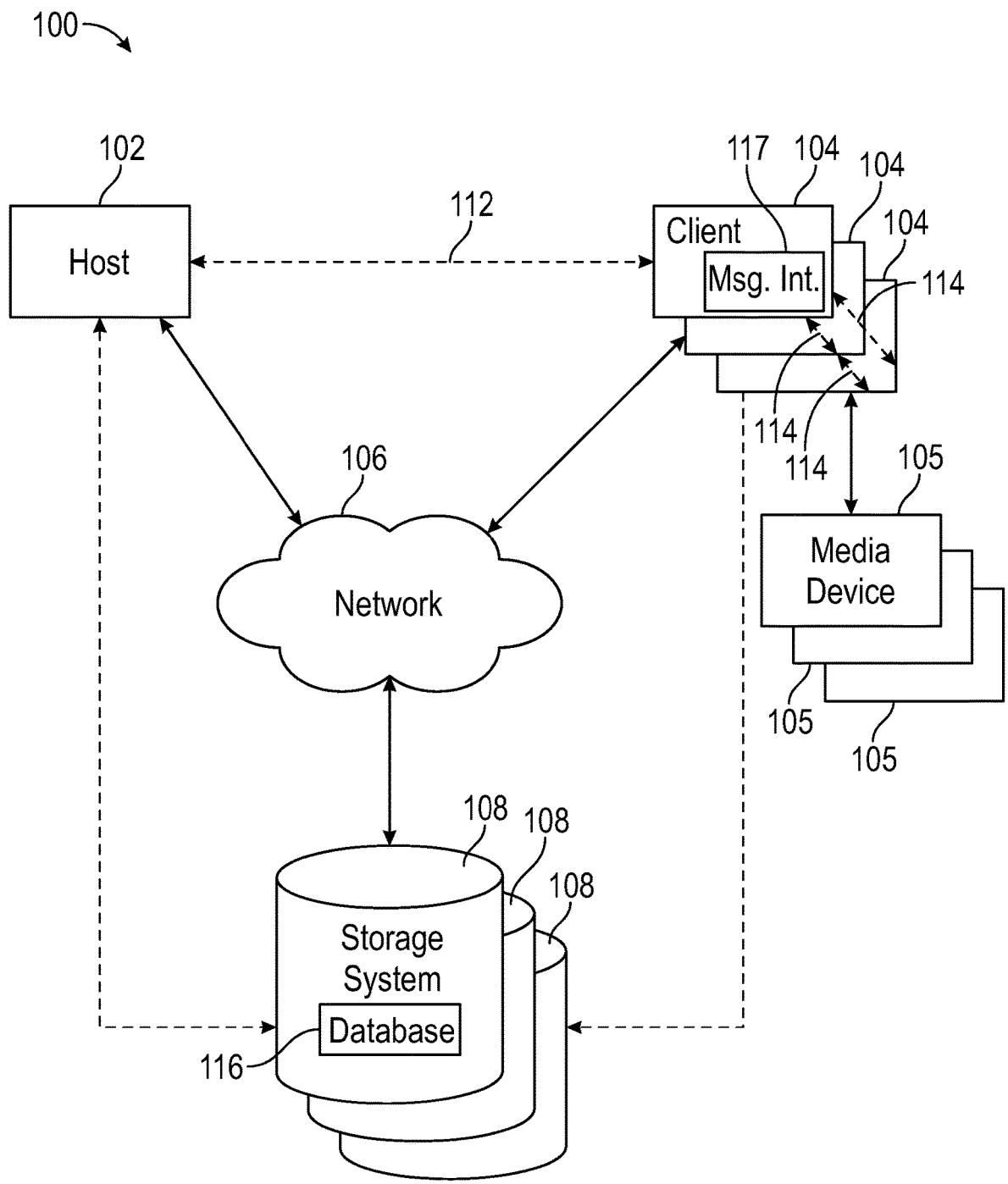
FIG. 1 illustrates an example communications system.

FIG. 1 illustrates an example communication system 100 for communicating between users through their respective user accounts. The system 100 includes a server 102 that acts as a host and facilitates communications between a plurality of client computing devices 104 used by group leaders, guardians, and minors. In one example, the server 102 is more than one computer jointly configured to process software instructions serially or in parallel.

In some examples, the server 102 is in communication with one or more networks such as a network 106 comprised of one or more computing devices. The network 106 may be a private local area network (LAN), a private wide area network (WAN), the Internet, a mesh network, a cloud computing network, or any other network as is known in the art.

The server 102 and the one or more client devices 104 typically include one or more of a computer processor, memory, a network device (e.g., wireless transceiver), and input and/or output devices and/or interfaces according to some examples. The memory may, for example, include UVPROM, EEPROM, FLASH, RAM, ROM, DVD, CD, a hard drive, or other computer readable medium which may store data and/or the archival software discussed herein. In some examples, the server 102 and client devices 104 include an input device, such as a keyboard, mouse, and/or touchscreen, and include one or more output devices such as a monitor, speakers, printers, etc. The server 102 and the client devices 104 may be a desktop computer, a laptop computer, a mobile device such as a smart phone or a tablet, or any other computer device.

In one example, each of the client devices 104 is a mobile device capable of accessing and locally running client software that provides access to a messaging interface 117. The messaging interface 117 is operable to transmit messages between the group leaders, guardians, and minors. The messages can take the form of a chat, a non-chat inbox (e.g., similar to an email inbox, but within the communication system 100), multimedia messages, voice calls, and/or video calls, for example, as discussed in detail below. In examples, one or more of the client devices 104 is configured to execute an iPhone Operating System (iOS) or Android OS front end client, for example, and a backend linked to the network 106 or a cloud computing environment, for example.

The server 102 and each of the client devices 104 include respective network interfaces that facilitate communication with the other systems and/or components of the network 106 utilizing various communications protocols such as Transmission Control Protocol/Internet Protocol (TCP/IP), User Datagram Protocol (UDP), hyper-text transfer protocol (HTTP), simple mail transfer protocol (SMTP), file transfer protocol (FTP) and the like. In some examples, the one or more client devices 104 are configured to communicate with the server 102 directly via a direct client interface 112 or over the network 106. In alternative examples, the one or more client devices 104 are configured to communicate with each other directly via a peer-to-peer interface 114.

One or more of the client devices 104 can be coupled to one or more media devices 105 such as a digital camera operable to capture digital images and/or audio streams. Example media devices 105 include an onboard camera integrated with a mobile device, or a Bluetooth or wireless device.

The system 100 additionally includes one or more storage systems 108, which in some examples are operable to store and provide access to a repository of data such as email, text, images and other data and communications to other computing devices. In examples, the storage system 108 is a storage area network device (SAN) configured to communicate with the server 102 and/or the one or more client devices 104 directly or over the network 106. In other examples, the storage system 108 is located within the server 102 or within at least one of the client devices 104. The storage system 108 may be configured to store one or more of computer software instructions, data, emails, text messages, images or other media files, database files, and configuration information, for example. In alternative examples, the server 102 and/or the one or more client devices 104 are configured to communicate media and other data in a cloud computing environment or to one or more third-party data locations via one or more web services. Each storage system 108 can provide at least one database 116 for storing communications and other data and information.

In examples, the system 100 is a client-server architecture configured to execute computer software on the server 102, including any of the archival functionality discussed herein, which is accessible by the one or more client devices 104 using either a thin client application or a web browser executing on the one or more client devices 104. In some examples, the server 102 loads the computer software instructions from local storage, or the storage system 108 into memory and executes the computer software using the one or more computer processors. Thus, the client of the client devices 104 can be a dedicated app, or a general web browser, for example.

Figure 2:
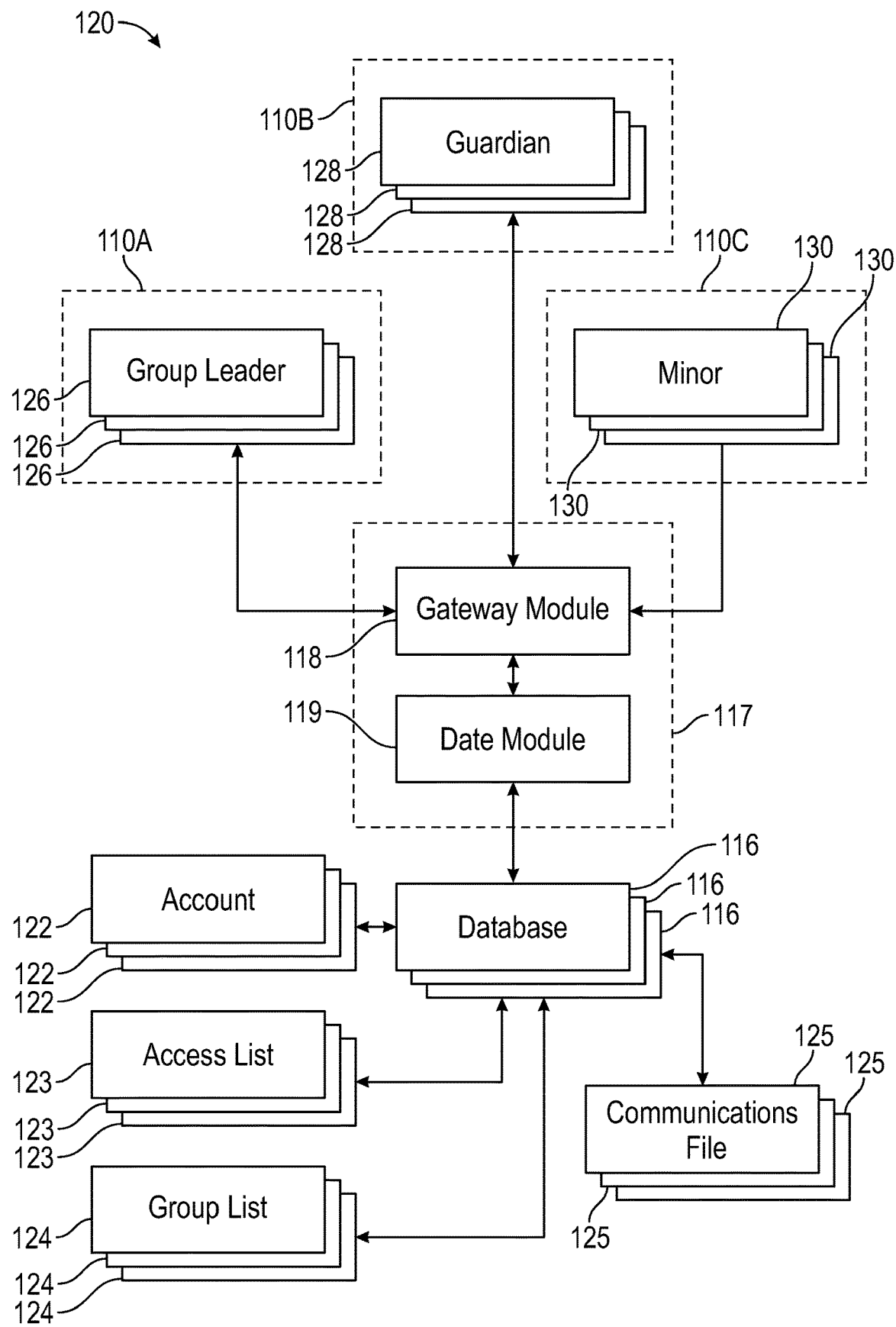
FIG. 2 illustrates an example messaging platform that can be utilized with the communication system of FIG. 1.

Referring to FIG. 2, with continuing reference to FIG. 1, a messaging platform 120 which provides a communications package for facilitating transparent communications between users via their user accounts is shown. The platform 120 can be implemented as one or more software applications executed by the server 102 and/or client devices 104, for example, and is operable to require group leaders to automatically include legal guardians (e.g., parents) in all electronic communications in the system 100 between minors and group leaders, and optionally also include legal guardians in all electronic communications between minors.

The messaging platform 120 includes a messaging interface 117 that utilizes a gateway module 118 and a data module 119. The gateway module 118 is operable to interface with a plurality of user groups 110A-C, including a group leader group 110A for group leaders 126, a guardian group 110B for guardians 128, and a minor group 110C for minors 130. The data module 119 is operable to interface with one or more databases 116 which can store or be linked to one or more user accounts 122, access lists 123, group lists 124, and communications or data files 125. The files 125 can include any of the data and information disclosed herein. Each of the group leaders 126, guardians 128 and minors 130 are associated with respective accounts 122 and one or more access lists 123 and/or group lists 124. For example, minor players on a team are associated with a team group list 124, which also is linked to the accounts of guardians of the minor players. If a coach coaches more than one team, the coach may be linked to multiple group lists 124.

The gateway module 118 serves as an intermediary between the group leaders 126 and minors 130 and is operable to automatically send or forward any and all communications between group leaders 126 and minors 130 to the respective guardian(s) 128 of the minors 130, whether the communication was initiated by the group leader 126 or minor 130. For each particular message transmitted by one of the group leader account and the minor account, a copy of the message is delivered to both the guardian account and to the other of the group leader account and minor account without requiring guardian approval of the particular message. Thus, message-by-message approval is not required from the guardian. However, guardian approval is needed to link the accounts of the group leader 126 and minor 130. The gateway module 118 is operable serve as a proxy that hides or abstracts external contact information of the minor 130 for contacting the minor outside of the messaging platform 120 (e.g., email address, telephone number, and physical and mailing addresses) from the group leader 126. Optionally, external contact information of the guardian 128 can also be hidden from the group leader 126. In one example, the messaging platform 120 does not store any external contact information for the minor 130. In such an example, if an administrator needs to contact the minor 130 (e.g., because the minor requested a password reset), password reset instructions could be sent to an email address of the minor's corresponding guardian 128.

The gateway module 118 is operable to blind copy the guardian 128 on all communications between the group leader 126 and minor 130. A minor 130 and group leader 126 can only exchange message if each of their respective accounts is linked to each other and to an account of the guardian 128 of the minor 130, and such linking can only happen with approval of the guardian 128. This prevents the group leader 126 and minor 130 from contacting each other in the messaging platform 120 without guardian supervision, and further prevents the group leader 126 and minor 130 from bypassing the messaging platform to transmit message to each other, because they cannot obtain each other's external contact information from the messaging platform 120.

The gateway module 118 is operable to coordinate the transfer of messages within the messaging platform 120 which could include messages in a chat interface (e.g., a group with all minor group members) and/or non-chat messages in an email format within the messaging platform 120. These are two-way communications which can be responded to by their recipients (e.g., the minors). In one example, the messaging platform 120 also permits group leaders 126 to transmit a second type of message, which is a broadcast message that cannot be responded to, to the guardian 128 and minor 130, but prohibits the guardian 128 and minor 130 from sending broadcast messages.

In one example, the gateway module 118 also permits voice and/or video calls between a group leader 126 and minor 130 if the guardian 128 is linked to the minor 130 and group leader 126 is the guardian 128 also available to join the call and/or if the guardian 128 is willing to accept recordings of such calls for later review. In examples, the guardian 128 can select an option of receiving copies of messages sent between their associated minor 130 and group leader 126 as they occur (e.g., in real time) and/or as a digest (e.g., on a daily or weekly basis).

In one example, voice and/or video calls between group leaders 126 and minors 130 are automatically recorded, and a copy of the recording and/or a transcript of the call is transmitted to the guardian 128. In one example, voice and/or video calls are only permitted for a minor if the minor's guardian is also available to join the call as a multi-party (i.e., 3 or more party) call. In some example, the system 100 is configured to only permit telephone calls between group leaders 126 and guardians 128.

Figure 3:
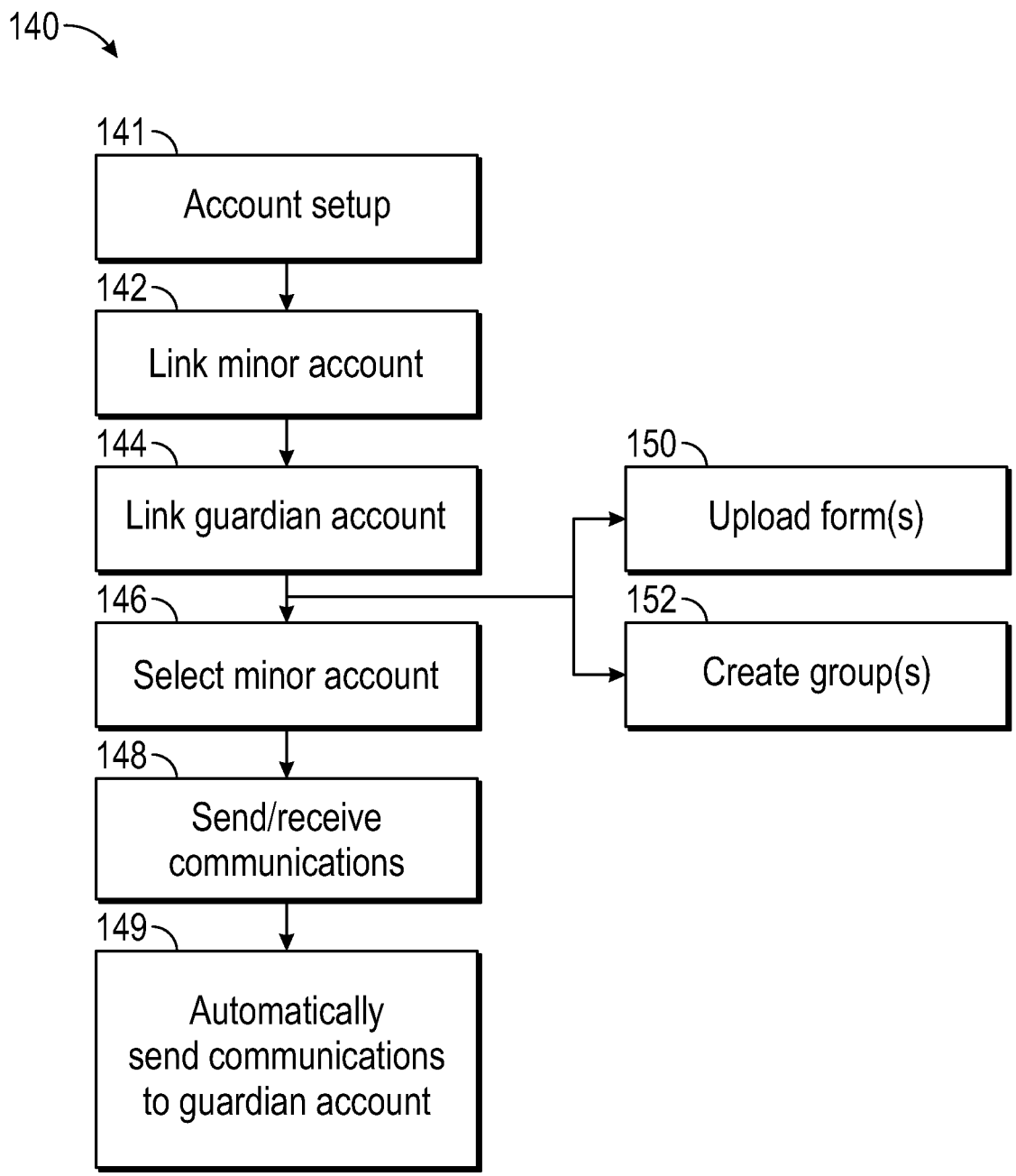
FIG. 3 illustrates an example process for communicating between users.

FIG. 3 illustrates an example process in a flowchart 140 for transparent communications using the messaging platform 120. The steps and features in the flowchart 140 are provided by the server 102 in cooperation with the client devices 104.

At block 141, a legal guardian 128 interacts with the messaging interface 117 to set up a guardian account 122. The guardian 128 must verify being age 18 or older. If there are two legal guardians 128 associated with the minor 130, both can share control of the minor account 122 of the minor 130. Block 141 also includes setting up the account 122 of the minor 130. In one example, block 141 includes the guardian 128 setting up the account 122 of the minor 130.

In one example, if a minor 130 attempts to set up an account 122 posing as an adult and then is later associated with his/her legal guardian's account 122, at least the minor's account 122 and optionally also the legal guardian's account 122 would be flagged and frozen until the account 122 of the actual legal guardian 128 can be verified. The system 100 can be configured such that no phone number or email address is associated with two different accounts 122 to preclude minors 130 from creating additional accounts 122 that their legal guardian 128 does not have access to.

In one example, the guardian 128 can choose not to provide external contact information for their minor 130. In this case, selecting a minor 130 would limit communications between the group leader 126 and the legal guardian 128. Legal guardians 128 can choose to include contact information for their minor 130, but block one or more individual or group accounts 122 from contacting their minor 130, which can be indicated in an access list 123. In examples, the account creator or guardian 128 can allow or block access to camera and/or location services associated with the minor 130.

In one example, such as where there is no external contact information for the minor, the minor account is part of the guardian account in the database(s) 116.

In examples, block 141 includes communicating a signup code or credentialed link from the group leader 126 or third party to the guardian 128 requesting the guardian 128 to sign up for access to the system 100. In one example, minors 130 cannot add themselves directly, but rather can only join through their guardian 128.

At block 142, each guardian 128 interacts with their respective messaging interface 117 to link their account 122 with the account 122 of their respective minor(s) 130. At block 144, each guardian 128 links their account 122 with the group leader(s) 126 associated with their respective minor(s) 130. At block 146, each group leader 126 interacts with the messaging interface 117 (e.g., of their respective mobile device) to select the account 122 of each minor 130 or group of minors 130 (e.g., in a group list 124) to communicate with. The account 122 of each guardian 128 associated with the account 122 of the minor(s) 130 is automatically included in any and all communications between the group leader 126 and the selected minor 130 or group of minors 130. By permitting the linking in block 146 between a minor account and group leader account, the guardian 128 is providing approval for subsequent messaging between the minor 130 account and group leader 126 account, and the guardian 128 will be copied on messages transmitted between those accounts.

In examples, one or more access lists 123 can be queried to permit or deny selection of the minor 130 by the group leader 126. For example, the account 122 of each guardian 128 can be associated with a respective access list 123. The guardian 128 can interact with the messaging interface 117 to indicate which group leaders 126 are permitted access to the respective minor(s) 130 within the system 100.

At block 148, the group leader 126 can send and/or receive messages or other communications with the selected minor 130 or group of minors 130. The messages could include text, graphical content (e.g., images, videos), audio recordings, and/or hyperlinks to external content outside of the messaging platform 120, for example. At block 149, the messages or communications are automatically copied or sent to the respective guardian(s) 128 in response to generating a message or communication between the group leader 126 and minor 130 at block 148. In examples, the group leader 126 can send and/or receive communications directly to the respective guardian(s) 128 without sending such communications to any minors 130.

At block 150, the guardian 128 can upload one or more forms into the system 100 for the guardian 128 to agree to allow their minor 130 to communicate with group leader 126. The forms can be stored as respective files 125 in the database 116 and linked to the accounts 122 of the guardian 128 and minor 130. The forms can be linked or otherwise communicated to the account 122 of the respective group leader 126. Example forms can include parental consent forms for conforming to any minor age protection with regard to communication between an adult and a minor.

At block 152, any account holder including group leaders 126 and guardians 128 can create one or more groups stored in a respective group list 124. Each group list 124 can be associated with one or more group leaders 126, guardians 128 and/or minors 130. An account 122 can be a group leader 126 in one group and a member of a group in other groups. Block 148 can include sending and/or receiving communications to each member of the selected group indicated in a corresponding group list 124.

Group creation can include large group setup and small group setup options. For large group setup, group rosters can be imported into or saved in a group list 124 with parent or guardian 128 contact for each minor 130 into the system. Guardians 128 who are members of the group can download a copy of relevant portions of the messaging platform 120 to establish the communications environment 110 and set up an account 122. The team or other group can immediately communicate with minors 130 and legal guardians 128 as soon as the legal guardians 128 upon account creation and linking with the respective group.

For small group setup, a group leader 126 creates a group in the system 100. Guardians 128 who are members of the group can download and/or access a copy of relevant portions of the messaging platform 120 to establish and set up an account 122. The group leader 126 can invite families to join the group. Once all members are part of the group, the group leader 126 can communicate with everyone in that group corresponding to a respective group list 124.

The messaging interface 117 enables group leaders 126 and minors 130 to transmit messages to each other as long as the accounts 122 of the minors 130, their associated guardians 128, and the group leaders 126 are linked. If a group leader 126 requests to unlink themselves from a particular guardian 128 account 122, then a link between the group leader 126 and a minor 130 associated with the guardian 128 will be automatically disabled, such hat the group leader 126 and minor 130 will be unable to transmit messages to each other in the messaging platform. This precludes the group leader 126 account 122 and minor 130 account 122 from transmitting additional messages to each other through the messaging interface 117. If an account 122 of a minor 130 becomes unlinked to the account 122 of their guardian 128 or is not yet linked to the account 122 of a guardian 128, the account 122 of the minor cannot be linked to any group leader 126 accounts 122.

Figure 4:
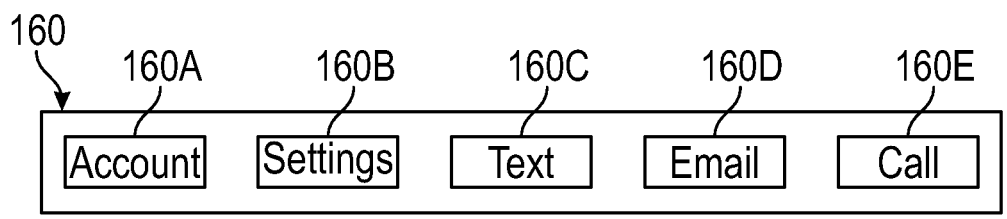
FIG. 4 illustrates an example main screen of the messaging platform of FIG. 2.

FIG. 4 illustrates an example main screen 160 that can be provided with the messaging platform 120 to interact with the system 100 and/or execute one or more steps of the process 140. Main screen 160 can include a row of buttons or commands 160A-160E for interacting with the system 100. Command 160A can be an account command. Command 160B can be a settings command Command 160C can be a text command. Command 160D can be an email command. Command 160E can be a call command. Although five commands are shown, it should be appreciated that the main screen 160 can provide access to fewer or more than five commands.

Figure 5:
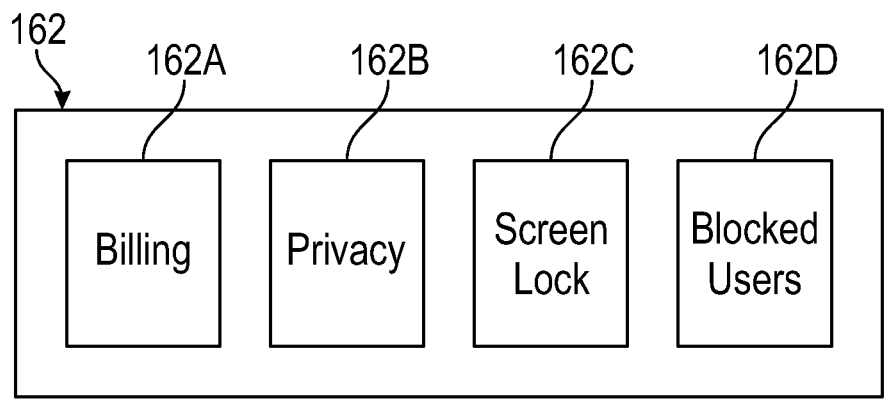
FIG. 5 illustrates an example account screen of the messaging platform of FIG. 2.

FIG. 5 illustrates an example account screen 162 than can be provided with the messaging platform 120 to interact with the system 100 and execute one or more steps of the process 140. The account screen 162 can be configured to display all personal information associated with the account 122. Region 162A can be an editable field including the phone and/or email of the guardian 128 and the respective minor 130. Region 162A can include billing information, such as credit card information for automatic annual subscription. Region 162B can be a privacy section that allows user to make the respective account 122 discoverable to other accounts 122 in the system 100, and an option to add a photo for the legal guardian 128 and minor 130. Region 162C can indicate a screen lock setting, which can require the user to unlock a device associated with the account 122 to access the account 122 in the system 100, which can limit other users from being able to alter the account settings. Region 162D can indicate a list of any users that are blocked from communications with the account 122 of the guardian 128 and/or minor 130.

Figure 6:
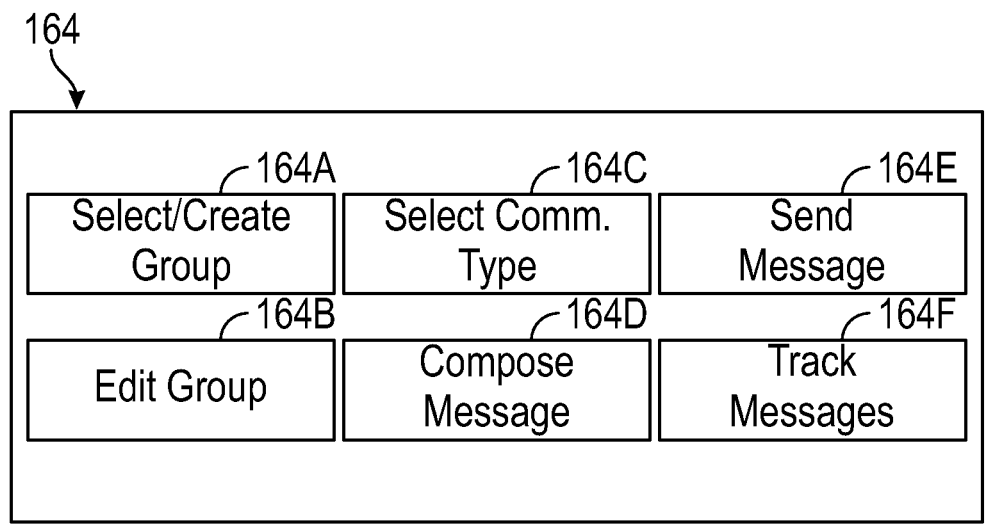
FIG. 6 illustrates an example group screen of the messaging platform of FIG. 2.

FIG. 6 illustrates an example group screen 164 than can be provided with the messaging platform 120 to interact with the system 100 and/or execute one or more steps of the process 140. Screen 164 includes buttons or commands 164A-164F for interacting with the system 100. Command 164A can be utilized to create a new group or select an existing group indicated in a corresponding group list 124. Command 164B can be utilized to add, remove or otherwise edit members of a group. Command 164C can select the type of communication (e.g., email, text or telephone). Command 164D can be selected to compose a message, which can include pictures and other attachments from the account holder's device. Command 164E can be selected to send the message. Command 164F can be utilized to track if group members have received, opened and/or replied to the message. Although six commands are shown, it should be appreciated that the group screen 164 can provide access to fewer or more than six commands.

The techniques disclosed herein provide several safeguards and transparent communications between group leaders and minors. Guardians can monitor communications with respective minors. Group leaders are unable to see or otherwise determine the contact information of minors. The communication link between a minor 130 and their guardian(s) 128 cannot be disabled without also disabling the link to the group leader(s) 126 the minor 130 is linked to. Thus, guardians have the option to limit any and all communications with their minor.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. A method of facilitating communication between a group leader and a minor through a messaging platform, comprising:
   linking a minor account of a minor to a guardian account of a legal guardian of the minor;
   linking a group leader account of a group leader of a group to which the minor belongs outside of the messaging platform to both the minor account and guardian account based on receiving approval from the guardian account;
   providing a messaging interface that enables the group leader account and minor account to transmit messages to each other within the messaging platform as long as the minor account remains linked to both the guardian account and the group leader account; and
   for each particular message transmitted by one of the group leader account and the minor account, delivering a copy of the message to both the guardian account and to the other of the group leader account and minor account without requiring guardian approval of the particular message;
   wherein the messages are a first type of message that can be responded to;
   wherein the messaging interface also enables the group leader account to submit a second type of message, which is a broadcast message that cannot be responded to, to the minor account and the guardian account; and
   wherein the minor account and guardian account cannot send the second type of message in the messaging platform.

2. The method of claim 1, wherein said linking the group leader account to the minor account can only be performed while the minor account remains linked to the guardian account.

3. The method of claim 1, wherein said delivering a copy of the message comprises delivering the message into a chat that includes the minor account.

4. The method of claim 3, wherein the chat is a group chat that also includes a plurality of additional minor accounts each linked to a respective additional guardian account.

5. The method of claim 1, wherein said delivering a copy of the message comprises delivering the message into a non-chat inbox in the messaging platform.

6. The method of claim 1, wherein the messaging platform does not store any external contact information for directly contacting the minor outside of the communication platform.

7. The method of claim 1, comprising:
   based on receiving a request from the group leader to unlink the group leader account from the guardian account, automatically unlinking the group leader account from both the guardian account and minor account, and disabling the group leader's access to the messaging interface, thereby precluding the group leader account and minor account from transmitting additional messages to each other through the messaging interface.

8. The method of claim 1, comprising preventing the group leader account from linking to a particular minor account based on the particular minor account not being linked to a guardian account.

9. A communication system that facilitates communication between a group leader and a minor in a messaging platform, comprising:
   a server and a plurality of client devices, each including a respective processor operatively connected to respective memory, wherein the server is operable to cooperate with the plurality of client devices to:
   link a minor account of a minor to a guardian account of a legal guardian of the minor;
   link a group leader account of a group leader of a group to which the minor belongs outside of the messaging platform to both the minor account and guardian account based on receiving approval from the guardian account;
   provide a messaging interface that enables the group leader account and minor account to transmit messages to each other within the messaging platform as long as the minor account remains linked to both the guardian account and the group leader account; and
   for each particular message transmitted by one of the group leader account and the minor account, deliver a copy of the message to the guardian account and to the other of the group leader account and minor account without requiring guardian approval of the particular message;
   wherein the messages are a first type of message that can be responded to;
   wherein the messaging interface also enables the group leader account to submit a second type of message, which is a broadcast message that cannot be responded to, to the minor account and the guardian account; and
   wherein the minor account and guardian account cannot send the second type of message in the messaging platform.

10. The communication system of claim 9, wherein the communication system only permits linking the group leader account to the minor account while the minor account remains linked to the guardian account.

11. The communication system of claim 9, wherein the server is configured to deliver a copy of the message to a chat interface of a software client on one of the client devices.

12. The communication system of claim 11, wherein the chat is a group chat that also includes a plurality of additional minor accounts each linked to a respective additional guardian account.

13. The communication system of claim 9, wherein the server is configured to deliver a copy of the message into a non-chat inbox of a software client on one of the client devices.

14. The communication system of claim 9, wherein the server does not store any external contact information for directly contacting the minor outside of the communication platform.

15. The communication system of claim 9, wherein the server is configured to, based on receiving a request from the group leader to unlink the group leader account from the guardian account, automatically unlink the group leader account from both the guardian account and minor account, and disable the group leader's access to the messaging interface, thereby precluding the group leader account and minor account from transmitting additional messages to each other through the messaging interface.

16. The communication system of claim 9, wherein the server is configured to prevent the group leader account from linking to a minor account based on the minor account not being linked to a guardian account.

17. A method of facilitating communication between a group leader and a minor through a messaging platform, comprising:

linking a minor account of a minor to a guardian account of a legal guardian of the minor, the minor account including external contact information for contacting the minor outside of the messaging platform, the external contact information including at least one of a phone number and email address for the minor;

linking a group leader account of a group leader of a group to which the minor belongs to both the minor account and guardian account;

providing a messaging interface that enables the group leader account and minor account to transmit messages to each other within the messaging platform as long as the minor account remains linked to both the guardian account and the group leader account;

for each message transmitted by one of the group leader account and the minor account, delivering a copy of the message to both the guardian account and to the other of the group leader account and minor account; and preventing the group leader account from accessing the external contact information for the minor in the messaging platform, thereby preventing the group leader from bypassing the messaging platform to transmit messages to the minor.

18. The method of claim 17, wherein:

the messages are a first type of message that can be responded to; and the messaging interface also enables the group leader account to submit a second type of message, which is a broadcast message that cannot be responded to, to the minor account and the guardian account; and the minor account and guardian account cannot send the second type of message in the messaging platform.

\* \* \* \* \*